INVENTOR.
HELMER C. HANSON

Feb. 19, 1957   H. C. HANSON   2,781,840
STAMP DISPENSING MACHINE
Filed Sept. 24, 1953   8 Sheets-Sheet 2

INVENTOR.
HELMER C. HANSON
BY Frank H. Harmon
ATTY.

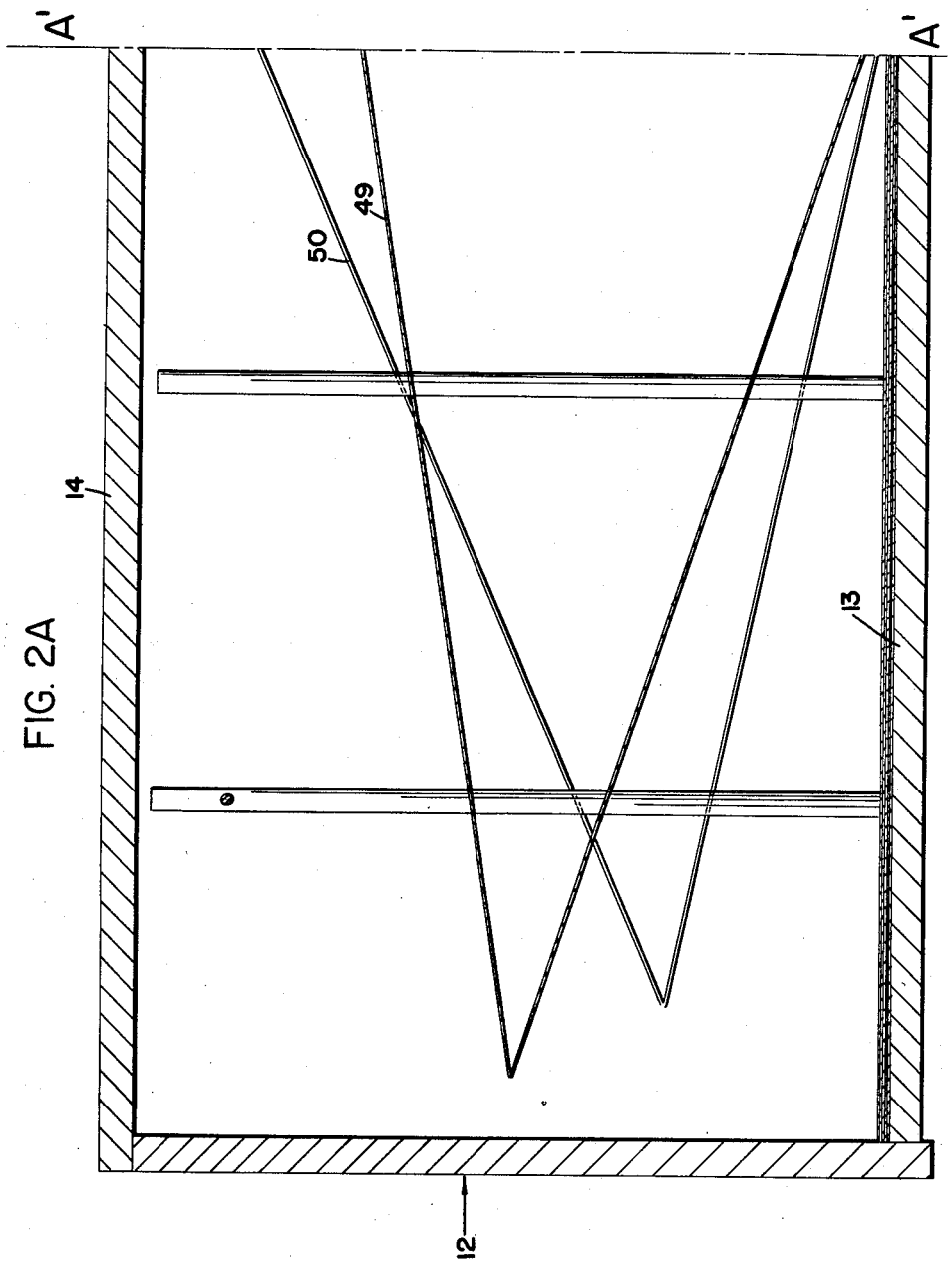

Feb. 19, 1957     H. C. HANSON     2,781,840
STAMP DISPENSING MACHINE
Filed Sept. 24, 1953     8 Sheets-Sheet 4
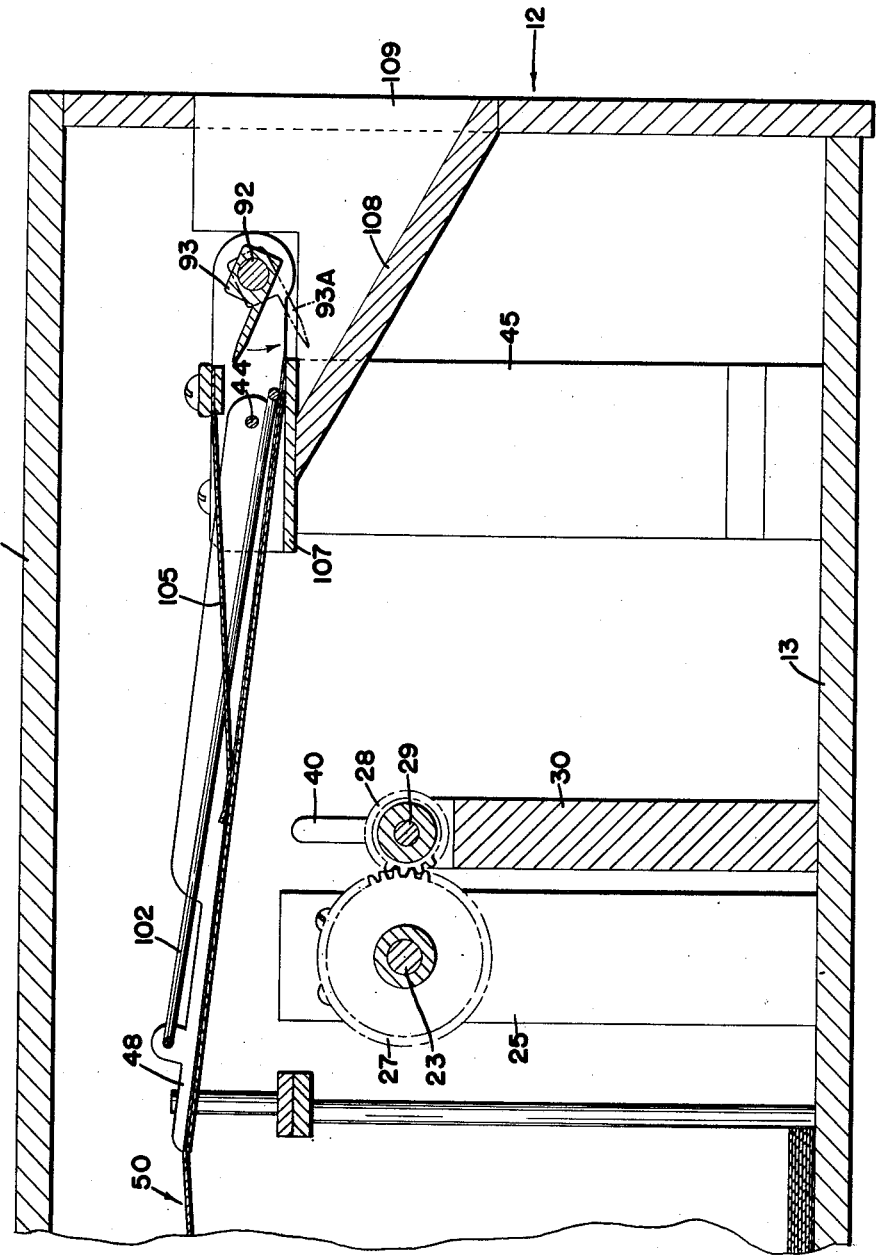
INVENTOR.
HELMER C. HANSON
BY
ATTY.

INVENTOR.
HELMER C. HANSON
ATTY.

Feb. 19, 1957 H. C. HANSON 2,781,840
STAMP DISPENSING MACHINE
Filed Sept. 24, 1953 8 Sheets-Sheet 6

INVENTOR.
HELMER C. HANSON
BY
ATTY.

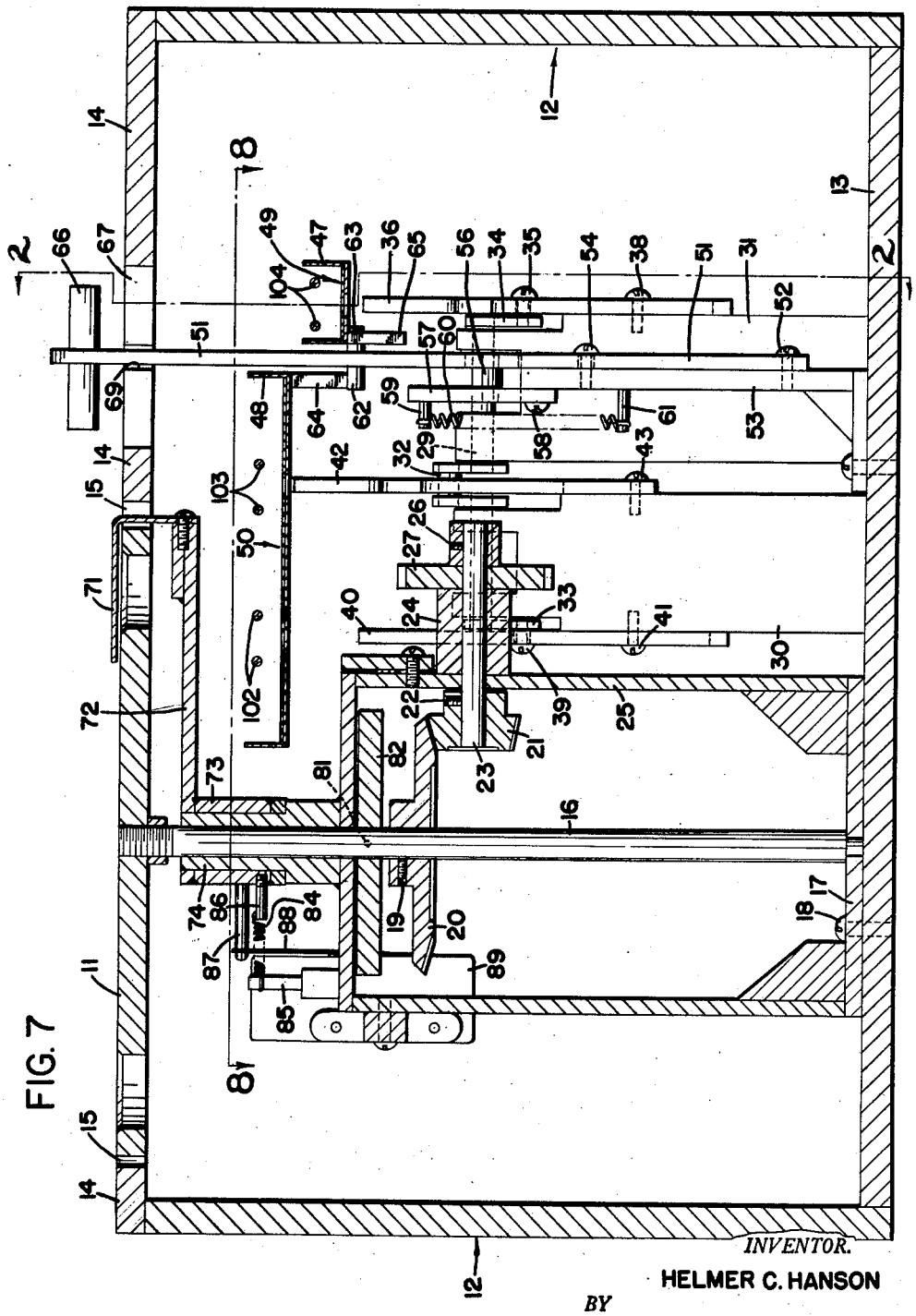

United States Patent Office 2,781,840
Patented Feb. 19, 1957

2,781,840

STAMP DISPENSING MACHINE

Helmer C. Hanson, Loveland, Colo., assignor, by mesne assignments, to Eureka Specialty Printing Company, Scranton, Pa., a corporation of Pennsylvania Application September 24, 1953, Serial No. 382,069

17 Claims. (Cl. 164—42)

This invention relates to improvements in mechanism for dispensing perforated sheets of strip material, such as trading stamps, tickets, and the like, that may be printed on long strips of paper, and is a continuation in part of my copending application for U. S. Letters Patent Ser. 206,031 for Selective Feed Mechanism for Stamp Dispensing Machine, filed January 15, 1951, now Patent No. 2,712,442.

In my aforesaid application, I have disclosed a stamp dispensing machine employing two separate and independent concentrically arranged dials, each being provided with finger holes comparable to those employed on a telepone dial. The dials amount to a means of selecting the number of stamps to be advanced through the machine and severed for handing to the customer, in that the operator, once having inserted his finger in one of the dial holes, rotates the dial in a clockwise direction and in doing so, the finger engages a lever that operates mechanism to brake and stop the sheet feeding mechanism at a predetermined point and a separately manually operated control brings about the severing of the sheet to dispense a number of stamps in accordance with the selection of the operator in the rotating of the respective dials.

One of the primary objects of my present invention is to provide a more simplified, inexpensive and efficient manual control means for selectively advancing and dispensing a predetermined number of stamps, and which involves the use of only a single manually operated dial.

As was the case in the device disclosed in my aforesaid application, my object is to provide such a machine, insofar as my invention relates to the dispensing of bonus trading stamps, with manual dial controlled mechanism for dispensing the proper number of stamps for each purchase that corresponds to the number of basic money units represented by such purchase. For example, it may be decided that one stamp should be dispensed to represent each ten cents spent by the customer, and for the purchase of a dollar item, the machine should be operated to dispense ten stamps for the customer.

In the interests of simplification of operation, by means of a single dial control, one of the primary objects of my invention is to provide two separate feeding chutes for the two strips, one of the two strips being of a single width and the other strip being of a width to include five of such units as represented by the single width strip. Thus, the manually selected and controlled advance of one unit length of the single strip and its severance and dispensing, provides the customer with one stamp representing the bonus for a ten cent purchase. The single manual dial, preferably includes ten finger holes equally spaced circumferentially so as to select the number of units of advance of the single sheet for any selected amount from one to ten, inclusive, so as to represent the bonus for purchases in increments of ten cents each from ten cents to a dollar, inclusive.

The companion strip, being five times as wide as the single strip, is utilized for advancing, severing and dispensing stamps to represent bonuses to the purchaser in increments of dollars. Being only five times as wide, to include five stamps for each given unit length, it is necessary for an advance of the wide strip to a distance of two unit lengths so as to comprise ten stamps to represent the bonus for the customer for each dollar purchase. Thus, a full rotation of the complete dial from the finger hole numbered 10 advances, severs and dispenses the proper number of stamps to represent the proper bonus to the customer for a ten dollar purchase. It will be seen that purchases in excess of ten dollars necessitates repeated operations of the dial. It will also be seen that the proper breakdown of any given number of stamps may be arrived at by the selected combined result of advancing, severing and dispensing of both the single width strip and the multiple five width strip of stamps.

In employing my selective single dial manual sheet advancing control, one of the primary objects of my invention is to provide a common operating crank shaft arrangement for operating a single strip perforation engaging strip feeding finger for the single strip and a pair of 180 degree staggered fingers for alternately engaging the perforation of the multi-width strip to bring about the two unit length advance of the wide strip upon each manual operation of the selector dial.

Another primary object of my invention is to provide such a manual dial control mechanism that, upon manual operation, continues to oscillate all three fingers into sheet advancing movements and to provide a simple conveniently arranged manual shifting lever for selectively bringing either of two tiltable chutes into such a position as to bring either sheet into such a position that the corresponding feed finger either engages the perforation of the sheet to advance it or continues to operate in its normal manner, while the other chute and its sheet have been elevated to such a position by the shifting lever out of the path of movement of the feeding finger, or fingers, so that despite the normal operation of the feeding fingers, one sheet is being advanced while the other remains stationary.

Another highly important object of my invention is to provide a main shaft braking lever, that is engaged by the operator's finger when selectively rotating the dial, with cam actuated means for positively applying a brake for the shaft and for additionally engaging a positive limit stop for bringing the shaft against any further movement, and for preventing any further feeding of the strips, after the completion of the selected manual rotation of the dial.

Another important object of my invention, is the provision of electrical means, including a solenoid, which, when energized, operates a helical severing blade for severing the advanced strips and a micro-switch that is automatically tripped upon manual release of the dial at the completion of each manual rotation of the dial, instantaneously for the purpose of energizing the solenoid for a single severing operation, after which the micro-switch becomes automatically disengaged.

With the foregoing and other objects in view, the invention resides in the combination of parts and in the details of construction hereinafter set forth in the following specifications and appended claims, certain embodiments thereof being illustrated in the accompanying drawings, in which:

Figure 1 is a top plan view of my dispensing machine shown enclosed within a housing, showing the selective and numbered operating dial and the brake actuating lever overlapping the same, the sheet shifting lever for the sheet chutes being shown as being shifted for the advancement of the single width sheet, the top of the housing being partly broken away to show the single width strip supported by the single width chute and the five width strip being supported by the five width chute;

Figure 2 is a view in longitudinal section taken along line 2—2 of Figure 1, and Fig. 7, showing in side elevation the three sheet advancing fingers, the crankshaft means for operating them, and showing the single width chute shifted to be depressed for engagement of its sheet by its single sheet advancing finger and showing the five width chute elevated out of reach of the two staggered sheet advancing fingers and also showing the solenoid and mechanism operated thereby for operating the severing cutting blade;

Figure 3 is a view in section taken along line 3—3 of Fig. 1 showing the multi width strip and chute and the driving gear connection between the gear directly driven by the dial, and the gear for rotating the common crankshaft for carrying the three staggered sheet advancing fingers;

Figure 7 is a view in section taken along line 7—7 of Figures 1 and 8, showing the dial, the gear train driven thereby, and the three sheets advancing fingers being driven in staggered relationship by a common crankshaft and gear connected to the main dial operated shaft;

Figure 1:
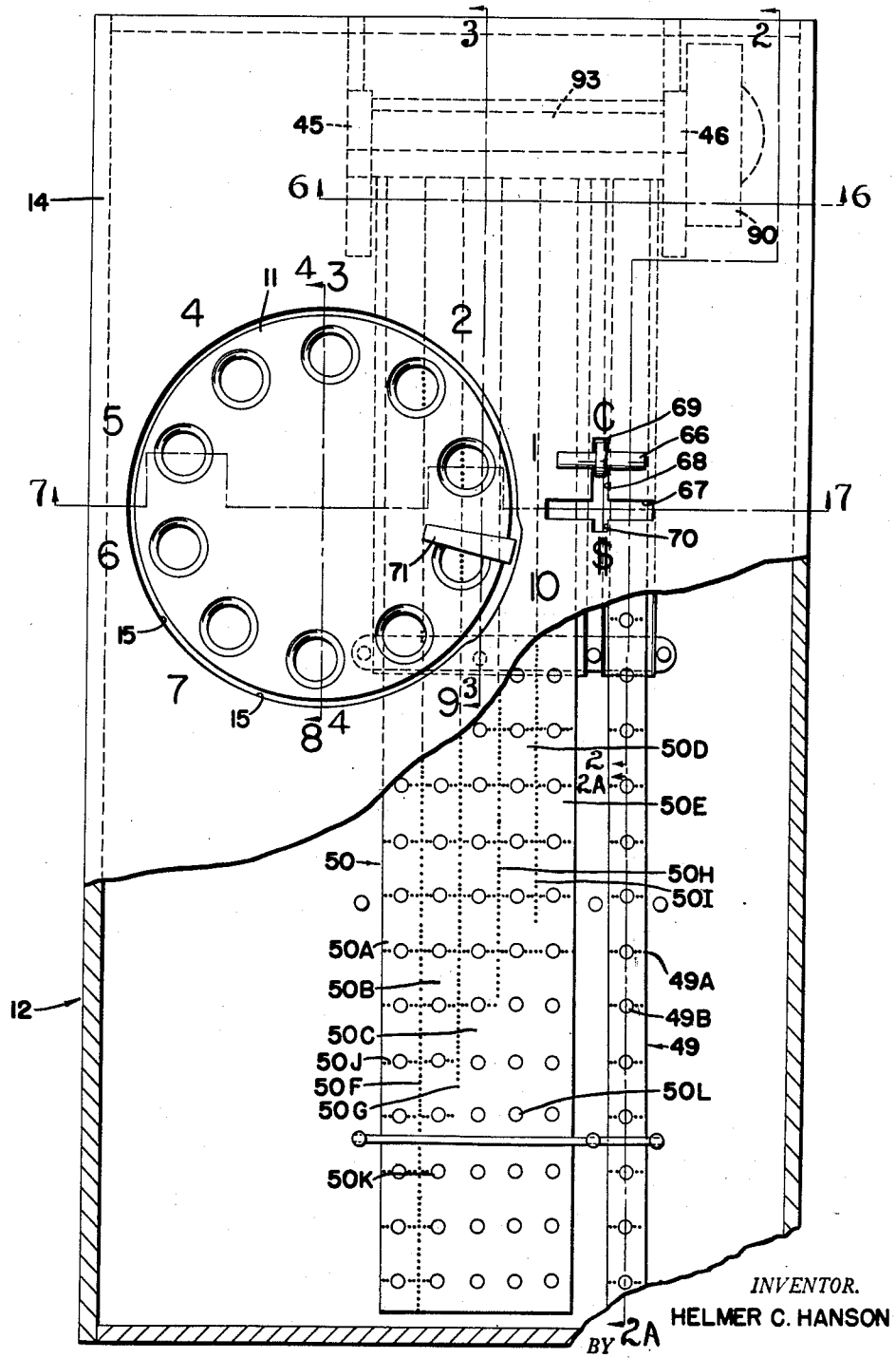

Referring more particularly to the drawings, I have shown at 11 a single selector dial mounted for clockwise manual rotation and provided with ten equidistantly circumferentially spaced finger holes numbered progressively counterclockwise from 1 to 10, inclusive, as viewed in Figure 1. The housing is generally indicated at 12 to include a base 13 and a top plate 14. The top plate 14 is preferably provided with a circular opening 15 to receive the dial 11 so that the top of the dial is flush with the top surface of plate 14. In this manner, the numbers 1 to 10, inclusive, may be painted on the top surface of plate 14 adjacent the opening 15 and the dial 11.

Figure 4:
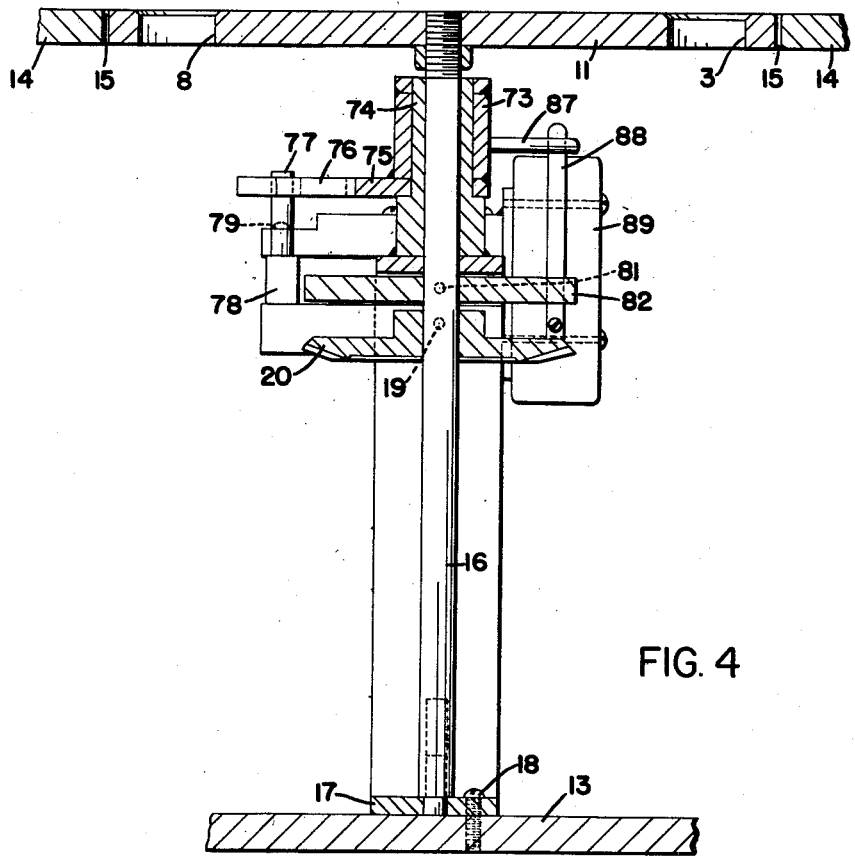
Figure 4 is a view in section taken along line 4—4 of Fig. 1, showing the dial, its main operating shaft, its main operating gear carried thereby, its brake and stop limit lever and microswitch operating mechanism actuated by the brake lever arranged in overlapping relationship with the dial.

The dial 11 is rigidly secured to a shaft 16 that is vertically supported by a plate 17, secured by bolts 18 to the housing base 13, for rotation. Rigidly secured to the main shaft 16, by means of a set screw 19 is a main drive bevel gear 20, as shown in Figures 4 and 7, that meshes with a bevel gear 21, secured by set screw 22 to a shaft 23 that rotates in a bushing 24 supported by an upright 25 rigid with plate 17. Secured to the other end of shaft 23 by means of a set screw 26 is a ring gear 27. This ring gear 27 meshes with a smaller gear 28 that is rigid with a shaft 29 that extends transversely with respect to the housing and parallel to shaft 23. Shaft 29 is supported for rotation by transversely spaced uprights 30 and 31, rigid with the base 13, and in the space between the uprights 30 and 31 is provided with a crankshaft throw 32. The inner end of shaft 29 carries a crankshaft throw 33 and the outer end of shaft 29 carries a crankshaft throw 34.

The outboard throw 34 has pivotally connected thereto by bolt 35 a finger lever 36 that is provided with an elongated longitudinal slot 37 to receive a bolt 38 secured to upright 31. The arrangement is such that rotation of throw 34 causes the finger to describe an upward rising arc on its forward stroke to merge into a lowering arc of movement during its back stroke. Likewise, the inboard throw 33 has pivotally connected thereto by a bolt 39 a finger 40 also provided with a guide slot, such as 37, to receive a bolt 41 secured to upright 30. The intermediate throw 32 directly pivotally carries a finger 42 that is also provided with a guide slot, such as 37, to receive a bolt 43 secured to upright 30. In this arrangement, rotation of shaft 29 causes throws 33, 32 and 34 to be rotated in unison and fingers 40, 42 and 36 to also be operated. Throws 33 and 34 and their fingers 40 and 36 are substantially aligned but the intermediate throw 32 and finger 42 are circumferentially offset to approximately 180 degrees, the reason for which is to be later more fully explained.

As stated before, one of the primary improvements over my invention disclosed in my aforesaid co-pending application is the provision of a dispensing machine that employs a single dial for dispensing stamps of a value of any combination of dollars and dimes. Accordingly, I provide a transverse rod 44 extending between uprights 45 and 46 carried by the base 13. Pivotally secured near their forward ends to rod 44 are two parallel longitudinally channeled sheet chutes 47 and 48. Chute 47 is wide enough to slidably accommodate a single width unit sheet 49, and chute 48 is wide enough to slidably accommodate a five unit width sheet 50.

As shown in Figure 1, sheet 49 is a long strip of paper provided at equidistant intervals with transverse tear strip perforations 49A which bisect apertures 49B provided for the purpose of being engaged by finger 36 to advance the strip to the front end of the machine. Strip 50 is comprised of five single width strips 50A, 50B, 50C, 50D and 50E joined together by perforation tear strips 50F, 50G, 50H and 50I, each strip being also provided at equidistant intervals with tear strip perforations 50J which bisect apertures such as 50K and 50L necessarily provided in strips 50B and 50D to be alternately and respectively engaged by fingers 40 and 42 to advance strip 50 two unit lengths at a time to the front end of the machine.

Figure 2:
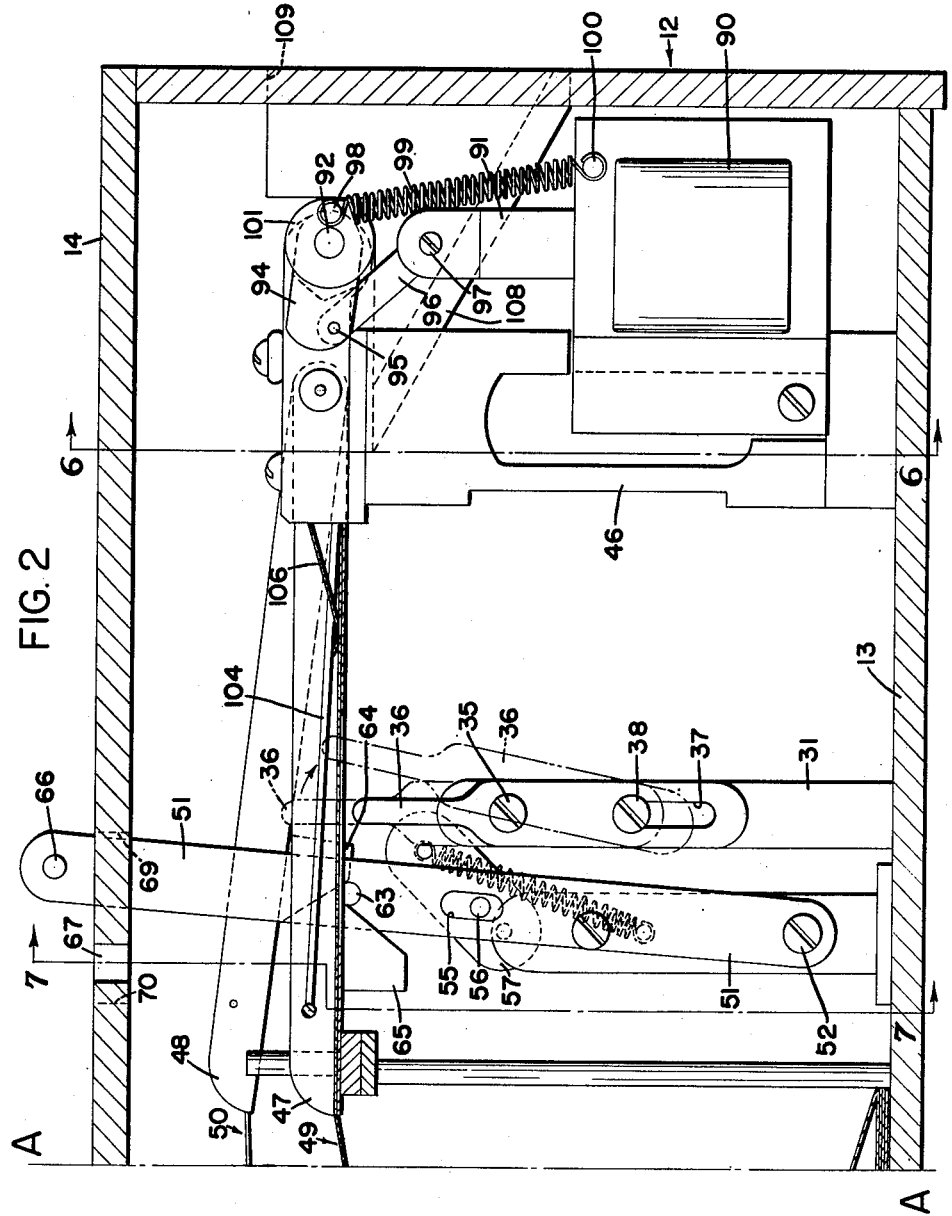
Figure 2a is a view in section taken along line 2a—2a of Figure 1, to show the casing to the rear of the mechanism shown in Fig. 2 as well as the disposition of the two folded strips in readiness to be fed to and through their respective chutes.

As stated before, when the single dial 11 is manually rotated in a clockwise direction, all three fingers 40, 42 and 36 are simultaneously operated by shaft 29 and the throws 33, 32 and 34, respectively. When the sheet chute 47 is depressed to bring the single width sheet 49 into position to have its apertures 49B engaged by operating finger 36, the sheet chute 48 containing the five width strip 40 is elevated so as to be out of the path of the 180 degrees staggered operating fingers 40 and 42, as shown in Figure 7. Thus, while the operating finger 36 is in position to advance the single width sheet, the operating fingers 40 and 42, although being operated simultaneously with finger 36, are performing no feeding operation, because of the elevation of the sheet chute 48. In order to provide for this selective operation, I provide a shifting lever 51 that is pivotally connected at 52 to an upright post 53 that is rigid with the base. This lever 51 is provided with a transverse slot to loosely receive a screw bolt 54 to provide for a limit stop in each direction for the movements of the shifting lever about a bolt 52 as its axis. Lever 51 also has a vertical slot 55 to be loosely engaged by a pin 56 carried by a lever 57 pivotally secured at 58 to post 53 and provided with a pin 59 to which is secured at its one end a tension spring 60 having its other end secured to a pin 61 carried by the stationary post 53. The shifting lever also carries transverse pins 62 and 63 to engage respectively oppositely inclined cams 64 and 65 carried on the adjacent inboard under surfaces of sheet chutes 50 and 49, respectively. For convenience of manual operation, the upper end of the shifting lever is provided with a cross pin 66 which extends upwardly beyond the upper surface of the housing top plate 14. For purposes of assembly, the top plate 14 is provided with a cross slot 67 to receive the cross pin 66 and is also provided with a longitudinal slot 68 for accommodating the movement of the shifting lever to the dime position shown at 69 in Figure 1 to the dollar position shown at 70. The shifting lever is shown in Figures 1, 2 and 7 as being shifted to the dime position, or in other words, in the forward position of the shifting lever. In shifting the shifting lever to this position, it will be seen that cross pin 63 has ridden down the cam 65 to assume its depressed position of Figure 7, while cross pin 62, in riding up the cam 64, has caused the positive elevation of the sheet chute 50 out of the operating limits of the sheet feeding fingers 40 and 42. It follows that shifting of the shifting lever to the rear, or counterclockwise about its pivot 52, as viewed in Figure 2, causes pin 63 to ride up the cam 65 to bring sheet chute 47 outside of the operating limits of the single sheet feeding finger 36, while cross pin 62 rides down the cam 64 to depress sheet chute 48 to bring the five width sheet 50 within the operating limits of the sheet advancing fingers 40 and 42.

Among the important features of my invention is the provision of means for insuring the proper feeding of a proper length of the sheets, whether it be of the single width or five width sheets, upon one given manual operation of the dial. It is to be borne in mind, that the operation of my machine contemplates a series of manual operations of the dial in a clockwise direction, as viewed in Figure 1, with no reversal of rotation of the dial. The manual operation of the dial, through its gear train, constitutes the means for operating the sheet feeding fingers to advance the sheet that has been selected by the shifting of the shifting lever. However, I provide positive means for insuring a definite length of feed of either strip in accordance with that selected by the dial. This mechanism is also manually operated and includes an extension 71 of a lever 72 rigid with a collar 73 that is loosely mounted about a bushing 74 that surrounds and supports shaft 16. Integral with collar 73, is a plate 75 that is provided with a cam slot 76 to receive an upright pin 77 carried by a lever 78 that is pivotally secured at 79 to a stationary bracket 80. Secured to the shaft 16 by pin 81 is a ring 82 that is provided with circumferentially spaced radially extending teeth, or projection, 83. Thus, upon rotation of the dial 11, both the gear 20 and the ring 82 are positively rotated. However, inasmuch as the extension 71 of lever 72 overlaps the upper edge of the dial, regardless of which finger hole is selected in the dial, when the dial nears the end of the selected stroke, the lever is likewise operated in a clockwise direction about its collar 73 and by reason of the engagement of its cam slot 76 with the pin 77 of lever 78, brings the lever 78 into braking engagement with ring 82 and, moreover, causes the forward end of lever 78 to abut the next projection 83 of ring 82 to prevent any further rotation of ring 82 and consequently prevent any further movement of the gear train by gear 20 and any further movement of the finger feeding mechanism. In this manner, there is positively prevented any movement of either strip of paper beyond the desired amount for each selective manual operation. Upon manual release of lever 72, it is returned to normal position in a counterclockwise direction by a tension spring 84 extending between the stationary post 85 and a pin 86 carried by collar 73. Also carried by collar 73 is a radially extending pin 87 which engages a vertically extending leaf spring 88 secured to a housing 89 carried by bracket 80 and containing a microswitch assembly. In circuit, through suitable leads with the microswitch assembly, is a conventional solenoid assembly including a coil 90 and a sliding armature 91.

At the forward end of the machine there is rotatably supported by shaft 92 a cutting blade 93 that extends transversely of the machine throughout the combined width of both strips 49 and 50. This blade is helically disposed with respect to its length with its lowermost cutting edge disposed adjacent the end where the solenoid is located. The strip cutting operation is the only part of the operation that is electrically responsive, the remainder being purely mechanical. It entails the usual plugging into the conventional electrical outlet to include the solenoid and microswitch in circuit. The blade shaft 92 carries at its one end a collar 101 and link 94 pivotally connected at 95 to a link 96 pivotally connected at 97 to armature 91. A tension spring 99 secured at 100 to the housing and to pin 98 of collar 101 normally urges the shaft 92 and blade 93 clockwise into inoperative relationship with respect to sheets 49 and 50, as shown in Figure 2.

Figure 9:
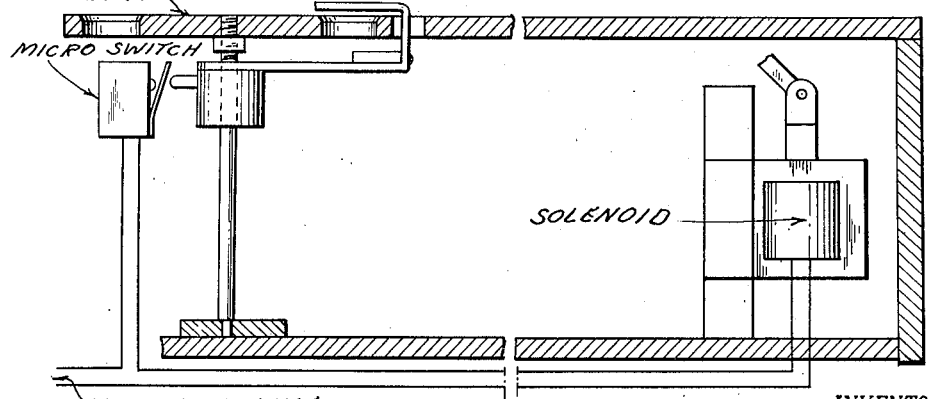
Figure 9 is a schematic view, showing the electrical connection between the microswitch assembly and the solenoid assembly and the electrical connection to the power source.
Figure 8:
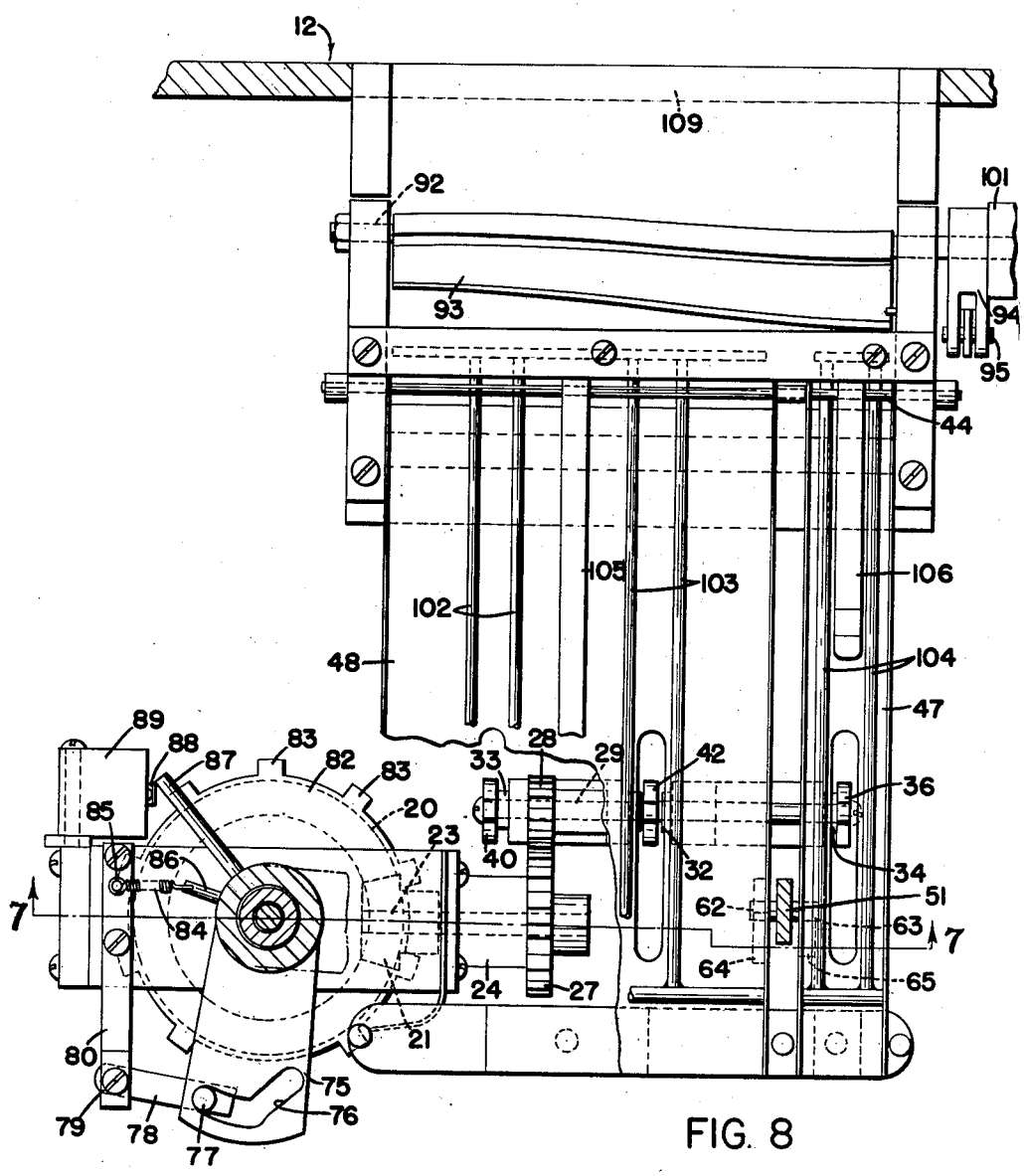
Figure 8 is a view in section taken along line 8—8 of Figure 7 showing the mechanism disclosed in Figure 7.

In Figure 9 I have schematically shown the electrical connection between the microswitch assembly and the solenoid assembly, as well as the electrical connection to the power line. As is conventional practice, the solenoid is preferably held in the extended position by a suitable spring. As soon as the circuit is completed by the microswitch the solenoid is energized and snaps the cutter blade. The micro switch is not closed by the backlash of the movable finger bar. When the machine is idle the finger bar is held by a spring to a neutral position that allows the micro switch to remain in the "off" position. When the operator completes a transaction the finger bar is moved about 36° in a clockwise direction. When the operator removes the finger the spring returns the finger bar. In so doing, the finger bar backlashes a little more in a clockwise direction than its resting position. This is the instant that the protrusion from the finger bar hub closes the microswitch. The microswitch and the piece that engages against it are shown in Figure 8.

Figure 5:
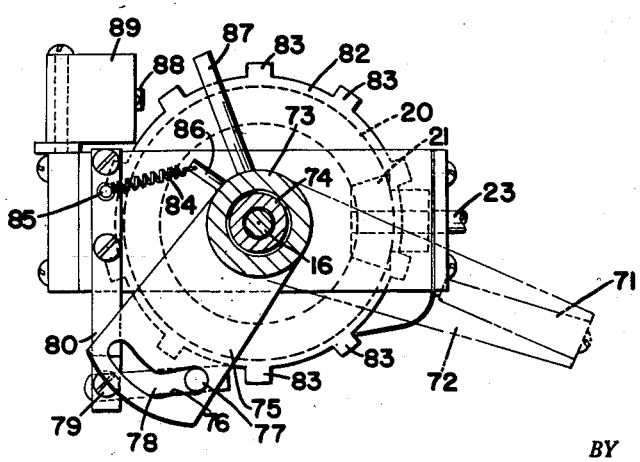
Figure 5 is a view in top plan of the mechanism shown in Figure 4, with the dial removed.
Figure 6:
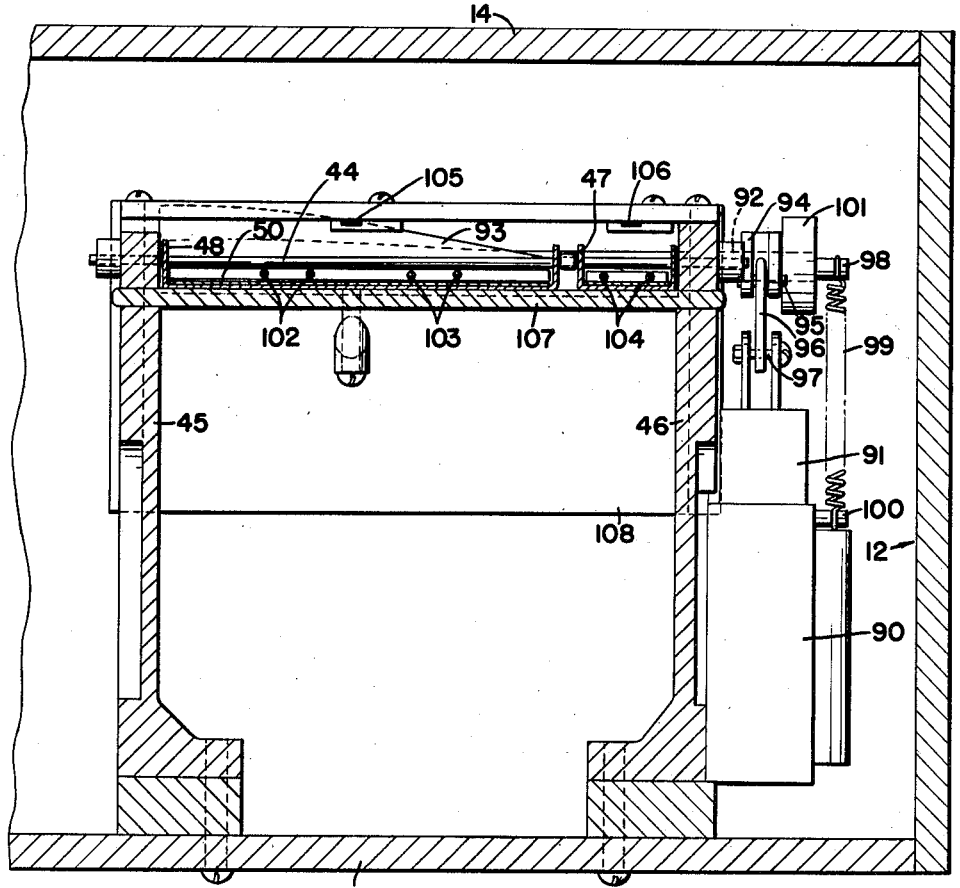
Figure 6 is a view in section taken along line 6—6 of Figure 1, showing the sheet severing blade and the solenoid actuated mechanism therefor.

Referring again to Figures 5 and 8, Figure 8 represents the at rest position with respect to the lever 71, 82 and the mechanism operated thereby. Pin 87 is shown lightly engaging leaf spring 88 but not with sufficient pressure to flex the leaf spring 88 to close the microswitch. Figure 5 represents the same assembly at the completion of the selected dial stroke, the same taking place in opposition to the force of tension spring 84. Upon release of the operator's finger from the selected dial hole, and consequently from lever 71, spring 84 quickly returns collar 73 counterclockwise so as to cause pin 87 to strike leaf spring 88 with sufficient impact to momentarily close the microswitch, after which the leaf spring 88 rebounds to open the switch. This momentary closing of the microswitch is sufficient to momentarily operate the solenoid to cause the lowering of armature 91 against the action of spring 99, and, through the linkage shown, cause a single rotation and strip cutting operation of the blade 93. As added refinements, guide rods 102, 103 and 104 and leaf springs 105 and 106 are provided to maintain sheets 50 and 49 in place as they slide on the upper surfaces of sheet chutes 48 and 47.

Assuming the customer to have made a purchase amounting to one dollar and ten cents, the operator of the machine should so operate the dial as to advance, sever and dispense two unit lengths of the five unit widths, as determined by the longitudinal and transverse tear perforations, of the strip 50. This is accomplished by the shifting of the shift lever 66 to the dollar slot 70 and the rotation of the dial in a clockwise direction with the operator's finger in the finger hole 2. This accomplishes the dispensing of ten stamps representing a bonus of one dollar in ten ten-cent stamp increments. Upon the completion of this operation, the operator then shifts the shift lever 66 to the forward dime slot 69, as indicated in Figure 1, and the manual rotation of the dial repeated with the operator's finger in the finger hole 1, which results in the advancing, severing and dispensing of one unit length of the single strip 49, representing the bonus for a ten cent purchase. The combined ten stamps of the wide strip 50 and the single stamp of the single strip 49, total the bonus for a one dollar and ten cent purchase.

Having described the machine more specifically with the single width strip 49 in position to be engaged by the feeding finger 36, I will now summarize the operation of the feeding, severing and dispensing apparatus with respect to the five unit width strip 50. Assuming the shift lever 66 to be shifted to the rear and to the dollar slot 70, it is to be understood that this raises the narrow sheet chute 47 into elevated position and out of the path of travel of the feed finger 36, while depressing the wide sheet chute 48 to its lower position to bring the wide strip 50 into the path of operation of the feed fingers 40 and 42. In other words, the two sheet chutes are reversed with respect to their positions shown in Figure 7. As previously explained, the manual rotation of the dial, through a positive gear train and the crankshaft 29, with its throws 33, 32 and 34, simultaneously operate all three fingers in the manner previously described. Also positively driven by the dial shaft 16, is the toothed plate 82. Inasmuch as there is no reversal of the dial in this direction of rotation, means must be provided for predetermining the end of the cycle of each operation of the dial in order to dispense the proper number of stamps, regardless of the number of stamps selected by the operator to be dispensed. This is accomplished by the provision of lever 72 with its extension 71 that overlaps the plane of movement of the finger holes so as to insure its being engaged by the finger as the dial is manually rotated. During the rotation of the dial for advancing the wide strip 50, and prior to it being brought to a stop by the braking mechanism operated by levers 72, 75 and 78, the fingers 42 and 40 have respectively engaged holes 50L of strip 50D and hole 50K of strip 50B, consecutively and alternately, in view of the fact that the fingers are offset 180 degrees with respect to the axis of rotation of the crankshaft 29. Thus, each finger has completed its separate cycle to advance the sheet 50 to the extent of advance of two unit lengths of the five unit width strip. The braking mechanism is mechanically predeterminedly synchronized in such a manner that as this proper predetermined length of advance of the strip has been accomplished, the lever 78, through the engagement of its pin 77 in the cam slot 76 of lever 75, has been forced into braking engagement with the toothed plate 82 and into abutment with one of the teeth 83 so as to prevent any further rotation of shaft 16 or its gear train, or the finger operating crankshaft 29. This leaves the strip fed into proper position on the forward edge of the shelf 107 for severing by the blade 93 and the dispensing of the severed strip down the chute 108 and through the discharge opening 109 of the housing.

Instead of providing a separate control means for accomplishing the cutting operation, I have provided the above described electrical means for accomplishing this, including the microswitch and solenoid energized thereby for operating the severing blade. In my improved arrangement, when the feeding operation cycle is completed, the finger is in the selected dial hole with the lever 71 being manually urged as far as the braking mechanism will permit. Having thus completed the sheet feeding operation, it is only necessary to remove the finger from the selected dial hole, immediately after which, spring 84 reverses collar 73, and consequently levers 72 and 75, are rotated in a counterclockwise direction. This brings pin 87 into sudden flexing engagement with spring 88 with sufficient force to cause only an instantaneous closing of the microswitch, after which the spring 88 rebounds to again open the microswitch. However, this instantaneous closing of the microswitch is sufficient to energize the solenoid to raise the armature 91, against the operation of tension spring 99, to bring about the movement of the cutting blade 93 with its shaft 92, in a counterclockwise direction, as viewed in Figure 3, from its full line upper position to its lower dotted line position 93A for one cutting operation, after which it is returned to its upper position out of engagement with the severing bar and the sheets by the force of spring 99.

I claim:

1. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, both of said stamp retainer chutes being pivotally connected to said supporting frame, means for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means.

2. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, both of said stamp retainer chutes being pivotally connected to said supporting frame, a manually operable shifting lever for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension for inward braking engagement with said ring and into abutment with a notch on its periphery to prevent further movement of said dial shaft, spring means, in opposition to said braking device, for releasing said braking device upon manual release thereof.

3. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, a stamp severing bar and a rotatable blade for severing and dispensing the selected length of stamps fed through either or both of said stamp retainer chutes, both of said stamp retainer chutes being pivotally connected to said supporting frame, means for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension for inward braking engagement with said ring and into abutment with a notch on its periphery to prevent further movement of said dial shaft, spring means, in opposition to said braking device, for releasing said braking means upon manual release thereof, a source of electrical power and a microswitch in circuit therewith, a solenoid in circuit with said microswitch and including a slidable armature pivotally connected to said severing blade, a flexible leaf spring mounted to be in normally spaced relationship with said microswitch to open the same, spring actuated means carried by said braking device and adapted, upon manual release to said braking device, to instantaneously flex said leaf spring to close said microswitch to energize said solenoid to operate said armature to rotate said severing blade for one cutting operation, upon the momentary closing of said microswitch, and resilient means for returning said severing blade to its normal position away from said severing bar and out of engagement with said continuous strips.

4. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferntially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, both of said stamp retainer chutes being pivotally connected to said supporting frame, means for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means.

5. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a spring manually operable rotatable dial with a plurality of circumferentially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, both of said stamp retainer chutes being pivotally connected to said supporting frame, means for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension thereby for inward braking engagement with said ring and into abutment with a notch on its periphery to prevent further movement of said dial shaft, spring means, in opposition to said braking device, for releasing said braking device upon manual release thereof.

6. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven by said shaft for engaging the openings of said strips for advancing said strips a predetermined distance in accordance with the manual rotation of said selector dial, a stamp severing bar and a rotatable blade for severing and dispensing the selected length of stamps fed through either or both of said stamp retainer chutes, both of said stamp retainer chutes being pivotally connected to said supporting frame, means for selectively and alternately depressing one retainer chute into a position in which the holes in one strip are engaged by said strip feeding means to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension thereby for inward braking engagement with said ring and into abutment with a notch on its periphery to prevent further movement of said dial shaft, spring means, in opposition to said braking device, for releasing said braking device upon manual release thereof, a source of electrical power and a microswitch in circuit therewith, a solenoid in circuit with said microswitch and including a slidable armature pivotally connected to said severing blade, a flexible leaf spring mounted to be in normally spaced relationship with said microswitch to open the same, spring actuated means carried by said braking device and adapted, upon manual release of said braking device, to instantaneously flex said leaf spring to close said microswitch and to energize said solenoid to operate said armature to rotate said severing blade for one cutting operation, upon the momentary closing of said microswitch, and resilient means for returning said severing blade to its normal position away from said severing bar and out of engagement with said continuous strips.

7. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven simultaneously by said shaft for engaging the openings of said strips for advancing said strips a predetermined distance in accordance with the manual rotation of said selector dial, both of said stamp retainer chutes being pivotally connected to said supporting frame, a manually operable shifting lever for selectively and alternately depressing one retainer chute into a position in which the holes in one strip are engaged to advance that strip upon operation of said selector dial, while simultaneously elevating the other stamp retainer chute out of the range of operation of its strip feeding means.

8. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven simultaneously by said shaft for engaging the openings of said strips for advancing said strips a predetermined distance in accordance with the manual rotation of said selector dial, both of said stamp retainer chutes being pivotally connected to said supporting frame, a manually operable shifting lever for selectively and alternately depressing one retainer chute into a position in which the holes in one strip are engaged to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension thereby for inward braking engagement with said ring and into abutment with a notch on its periphery to prevent further movement of said dial shaft, spring means, in opposition to said braking device, for releasing said braking device upon manual release thereof.

9. In a stamp dispensing machine having a housing and a supporting frame mounted therein, a pair of stamp retainer chutes, one of which is adapted to receive a single width continuous strip of stamps, and the other of which is adapted to receive a plural unit with continuous strip of stamps, each of said continuous strips of stamps having regularly longitudinally spaced openings therein, a single manually operable rotatable dial with a plurality of circumferentially arranged finger holes to constitute a selector dial, a rotatable shaft carried by said dial, separate strip feeding means driven simultaneously by said shaft for engaging the openings of said strips for advancing said strips a predetermined distance in accordance with the manual rotation of said selector dial, a stamp severing bar and a rotatable blade for severing and dispensing the selected length of stamps fed through either or both of said stamp retainer chutes, both of said stamp retainer chutes being pivotally connected to said supporting frame, a manually operable shifting lever for selectively and alternately depressing one retainer chute into a position in which the holes in one strip are engaged to advance that strip upon operation of said selector dial, while simultaneously elevating the other stamp retainer chute out of the range of operation of its strip feeding means, a braking device loosely mounted on said dial selector dial shaft and having an extension overlapping said selector dial to be engaged by the finger of the operator near and during the completion of the manual operation of the selector dial, a peripherally notched ring rigidly carried by said selector dial shaft, said braking device including means actuated by said extension thereby for inward braking engagement with said ring and into abutment with a notch on its periphery to prevent further movement of said dial shaft, spring means, in opposition to said braking device, for releasing said braking means upon manual release thereof, a source of electrical power and a microswitch in circuit therewith, a solenoid in circuit with said microswitch and including a slidable armature pivotally connected to said severing blade, a flexible leaf spring mounted to be in normally spaced relationship with said microswitch to open the same, spring actuated means carried by said braking device and adapted, upon manual release of said braking device, to instantaneously flex said leaf spring to close said microswitch and to energize said solenoid to operate said armature to rotate said severing blade for one cutting operation, upon the momentary closing of said microswitch, and resilient means for returning said severing blade to its normal position away from said severing bar and out of engagement with said continuous strips.

10. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft rigidly carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset for alternate engagement with spaced openings in two of the stamps of said plural unit stamp width strip.

11. In a stamp dispensing machine having a housing and a supporting frame mounted therein, a pair of stamp retainer chutes, one of which is adapted to receive a single width continuous strip of stamps, and the other of which is adapted to receive a plural unit width continuous strip of stamps, each of said continuous strips of stamps having regularly longitudinally spaced openings therein, a single manually operable rotatable dial with a plurality of circumferentially arranged finger holes to constitute a selector dial, a rotatable shaft rigidly carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset for alternate engagement with spaced openings in two of the stamps of said plural unit stamp width strip, both of said stamp retainer chutes being pivotally connected to said supporting frame, a manually operable shifting lever for selectively and alternately engaging said chutes so as to depress one retainer chute into a position in which the feeding finger engages the holes in one strip upon operation of said selector dial, while simultaneously elevating the other stamp retainer chute out of the range of operation of the other feeding finger.

12. In a stamp dispensing machine having a housing and a supporting frame mounted therein, a pair of stamp retainer chutes, one of which is adapted to receive a single width continuous strip of stamps, and the other of which is adapted to receive a five unit width continuous strip of stamps, each of said continuous strips of stamps having regularly longitudinally spaced openings therein, a single manually operable rotatable dial with ten equidistantly circumferentially aranged finger holes to constitute a selector dial, a rotatable shaft carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset 180° for alternate engagement with spaced openings in two of the five unit width of stamps of said five unit stamp width strip, both of said stamp retainer members being pivotally connected to said supporting frame, a manually operable shifting lever for selectively and alternately engaging said chutes so as to depress one retainer chute into a position in which the feeding finger engages the holes in one strip upon operation of said selector dial, while simultaneously elevating the other stamp retainer chute out of the range of operation of the other feeding finger, a braking device loosely mounted on said dial selector shaft, and having an extension overlapping the selector dial to be engaged by the finger of the operator near and during the completion of the manual operation of the selector dial, a peripherally notched ring carried by said selector dial shaft, said braking device including a cam and a lever actuated thereby for inward braking engagement with said ring and into abutment with a notch on its periphery to prevent further movement of said dial shaft, spring means, in opposition to said braking device, for releasing said braking device upon manual release thereof.

13. In a stamp dispensing machine having a housing and a supporting frame mounted therein, a pair of stamp retainer chutes, one of which is adapted to receive a single width continuous strip of stamps, and the other of which is adapted to receive a five unit width continuous strip of stamps, each of said continuous strips of stamps having regularly longitudinally spaced openings therein, a single manually operable rotatable dial with ten equidistantly circumferentially arranged finger holes to constitute a selector dial, a rotatable shaft carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset 180° for alternate engagement with spaced openings in two of the five unit width of stamps of said five unit stamp width strip, both of said stamp retainer chutes being pivotally connected to said supporting frame, said stamp retainer members being provided on their under surfaces with cams inclined in directions opposite to the other, a manually operable shifting lever for selectively and alternately engaging said cams so as to depress one retainer chute into a position in which the feeding finger engages the holes in one strip upon operation of said selector dial, while simultaneously elevating the other stamp retainer chute out of the range of operation of the other feeding finger, a braking device loosely mounted on said dial selector shaft, and having an extension overlapping the selector dial to be engaged by the finger of the operator near and during the completion of the manual operation of the selector dial, a peripherally notched ring carried by said selector dial shaft, said braking device including a cam and a lever actuated thereby for inward braking engagement with said ring and into abutment with a notch on its periphery to prevent further movement of said dial shaft, spring means, in opposition to said braking device, for releasing said braking device upon manual release thereof.

14. In a stamp dispensing machine having a housing and a supporting frame mounted therein, a pair of stamp retainer chutes, one of which is adapted to receive a single width continuous strip of stamps, and the other of which is adapted to receive a five unit width continuous strip of stamps, each of said continuous strips of stamps having regularly longitudinally spaced openings therein, a single manually operable rotatable dial with ten equidistantly circumferentially arranged finger holes to constitute a selector dial, a rotatable shaft carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset 180° for alternate engagement with spaced openings in two of the five unit width of stamps of said five unit stamp width strip, both of said stamp retainer members being pivotally connected to said supporting frame, manually operable means for selectively and alternately engaging said chutes so as to depress one retainer chute into a position in which the feeding finger engages the holes in one strip upon operation of said selector dial, while simultaneously elevating the other stamp retainer chute out of the range of operation of the other feeding finger, a braking device loosely mounted on said dial selector shaft, and having an extension overlapping the selector dial to be engaged by the finger of the operator near and during the completion of the manual operation of the selector dial, a peripherally notched ring carried by said selector dial shaft, said braking device including a cam and a lever actuated thereby for inward braking engagement with said ring and into abutment with a notch on its periphery to prevent further movement of said dial shaft, spring means, in opposition to said braking device, for releasing said braking device upon manual release thereof.

15. In a stamp dispensing machine having a housing and a supporting frame mounted therein, a pair of stamp retainer chutes, one of which is adapted to receive a single width continuous strip of stamps, and the other of which is adapted to receive a five unit width continuous strip of stamps, each of said continuous strips of stamps having regularly longitudinally spaced openings therein, a single manually operable rotatable dial with ten equidistantly circumferentially arranged finger holes to constitute a selector dial, a rotatable shaft carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset 180° for alternate engagement with spaced openings in two of the five unit width of stamps of said five unit stamp width strip, a stamp severing bar and a rotatable blade for severing and dispensing the selected length of stamps fed through either or both of said stamp retainer chutes, both of said stamp retainer chutes being pivotally connected to said supporting frame, a manually operable shifting lever for selectively and alternately engaging said cams so as to depress one retainer chute into a position in which the feeding finger engages the holes in one strip upon operation of said selector dial, while simultaneously elevating the other stamp retainer chute out of the range of operation of the other feeding finger, a braking device loosely mounted on said dial selector shaft, and having an extension overlapping the selector dial to be engaged by the finger of the operator near and during the completion of the manual operation of the selector dial, a peripherally notched ring carried by said selector dial shaft, braking device including a cam and a lever actuated thereby for inward braking engagement with said ring and into abutment with a notch on its periphery to prevent further movement of said dial shaft, spring means, in opposition to said braking device, for releasing said braking device upon manual release thereof, a pin carried by said braking means and connected to said spring means, a source of electrical power and a microswitch in circuit therewith, a solenoid in circuit with said microswitch and including a slidable armature pivotally connected to said severing blade, a flexible leaf spring mounted to be in normally spaced relationship with said microswitch to open the same, said pin, upon manual release of said braking device, being adapted to be returned by said spring means to instantaneously flex said leaf spring to close said microswitch and to energize said solenoid to rotate said severing blade for one cutting operation, upon the momentary closing of said microswitch, and resilient means for returning said severing blade to its normal position out of engagement with said severing bar and said continuous strips.

16. In a stamp dispensing machine having a housing and a supporting frame mounted therein, a pair of stamp retainer chutes, one of which is adapted to receive a single width continuous strip of stamps, and the other of which is adapted to receive a five unit width continuous strip of stamps, each of said continuous strips of stamps having regularly longitudinally spaced openings therein, a single manually operable rotatable dial with ten equidistantly circumferentially arranged finger holes to constitute a selector dial, a rotatable shaft carried by said dial, a crankshaft rotatable in a plane transversely of said strips and having longitudinally spaced throws, a gear train between said dial shaft and said crankshaft for operating said crankshaft upon rotation of said selector dial, a single strip feeding finger carried by one of said throws for arcuate rotary movement into and out of engagement with the openings of said single strip for advancing said single strip a predetermined distance in accordance with the manual rotation of said selector dial, the other two throws of said crankshaft carrying a pair of longitudinally spaced strip feeding fingers that are offset 180° for alternate engagement with spaced openings in two of the five unit width of stamps of said five unit stamp width strip, a stamp severing bar and a rotatable blade for severing and dispensing the selected length of stamps fed through either or both of said stamp retainer chutes, both of said stamp retainer members being pivotally connected to said supporting frame, said stamp retainer members being provided on their under surfaces with cams inclined in directions opposite to the other, a manually operable shifting lever for selectively and alternately engaging said cams so as to depress one retainer chute into a position in which the feeding finger engages the holes in one strip upon operation of said selector dial, while simultaneously elevating the other stamp retainer chute out of the range of operation of the other feeding finger, a braking device loosely mounted on said dial selector shaft, and having an extension overlapping the selector dial to be engaged by the finger of the operator near and during the completion of the manual operation of the selector dial, a peripherally notched ring carried by said selector dial shaft, braking device including a cam and a lever actuated thereby for inward braking engagement with said ring and into abutment with a notch on its periphery to prevent further movement of said dial shaft, spring means, in opposition to said braking device, for releasing said braking device upon manual release thereof, a pin carried by said braking device and connected to said spring means, a source of electrical power and a microswitch in circuit therewith, a solenoid in circuit with said microswitch and including a slidable armature pivotally connected to said severing blade, a flexible leaf spring mounted to be in normally spaced relationship with said microswitch to open the same, said pin, upon manual release of said braking device, being adapted to be returned by said spring means to instantaneously flex said leaf spring to close said microswitch and to energize said solenoid to rotate said severing blade for one cutting operation, upon the momentary closing of said microswitch, and resilient means for returning said severing blade to its normal position out of engagement with said severing bar and said continuous strips.

17. In a stamp dispensing machine having a supporting frame, a pair of stamp strip supply means each including a strip guiding device shiftably mounted on the frame, the stamp strips being in continuous form with regularly longitudinally spaced feed openings, a single first selector means including manually operable parts for selecting the quantity of stamps to be delivered, feed means engageable with said openings and controlled by said selector means, and a second selector means effective for shifting said guiding devices and thereby engaging one of said stamp strips with said feed means while removing the other said strip from engagement therewith, whereby the said second selector means determines the action of said first selector means in procuring delivery from one or the other stamp supply means.

References Cited in the file of this patent

UNITED STATES PATENTS

| 1,119,180 | Krauth | Dec. 1, 1914 |
| 1,503,164 | Kudler | July 29, 1924 |
| 2,249,575 | O'Brien et al. | July 15, 1941 |
| 2,258,912 | Steen et al. | Oct. 14, 1941 |
| 2,264,647 | Stearns | Dec. 2, 1941 |
| 2,727,570 | Hempel | Dec. 20, 1955 |